Patented June 20, 1950

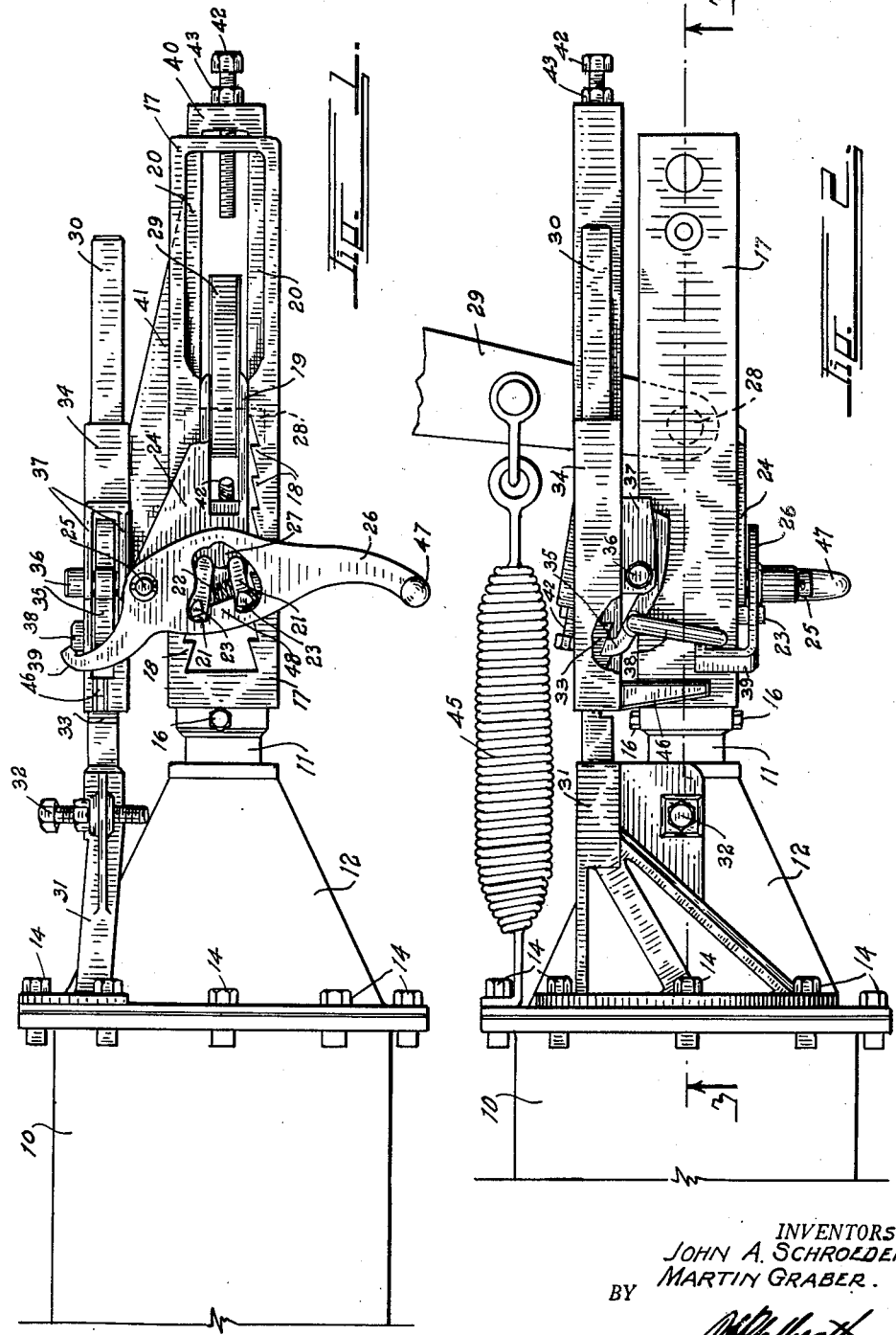

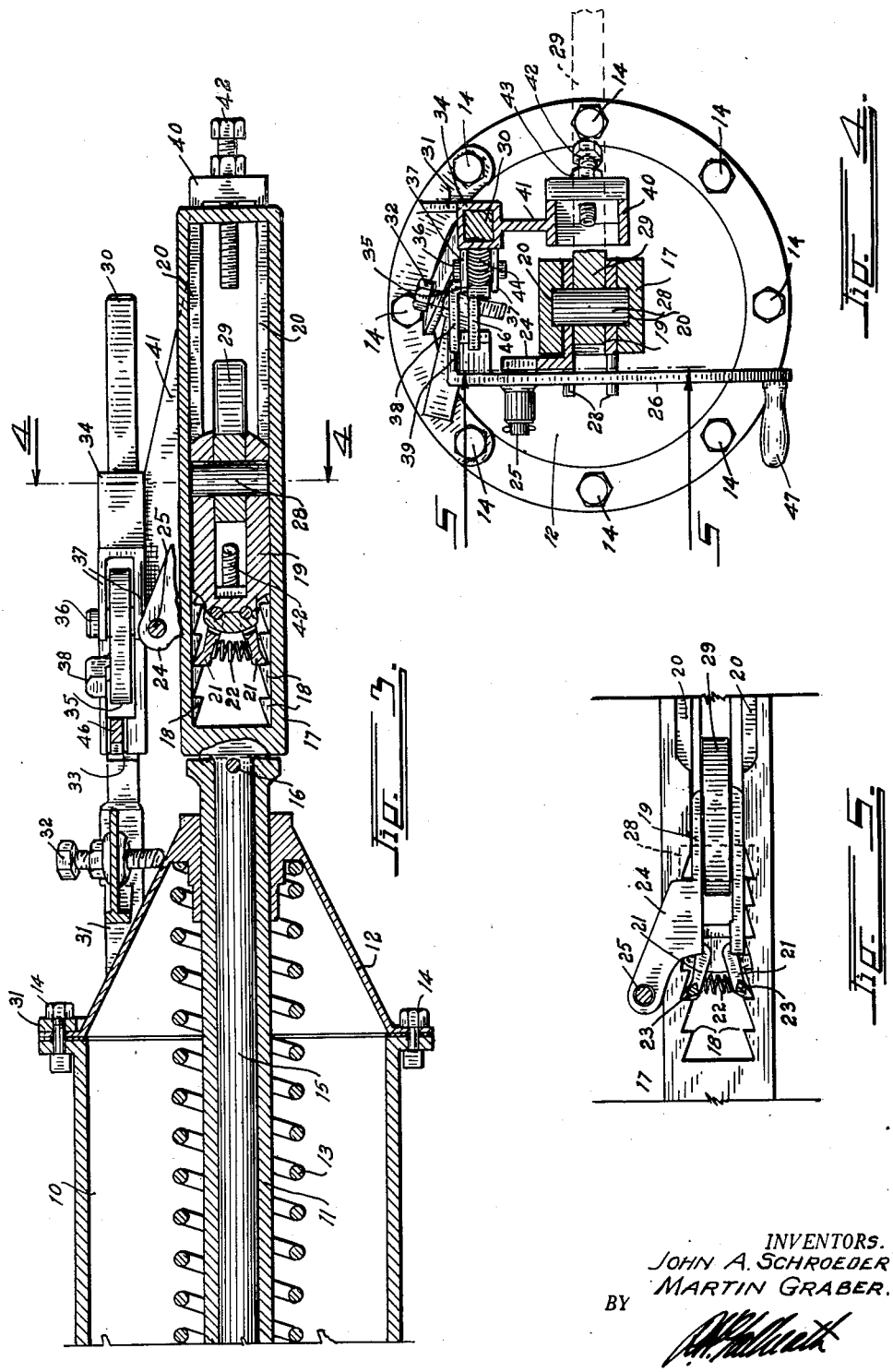

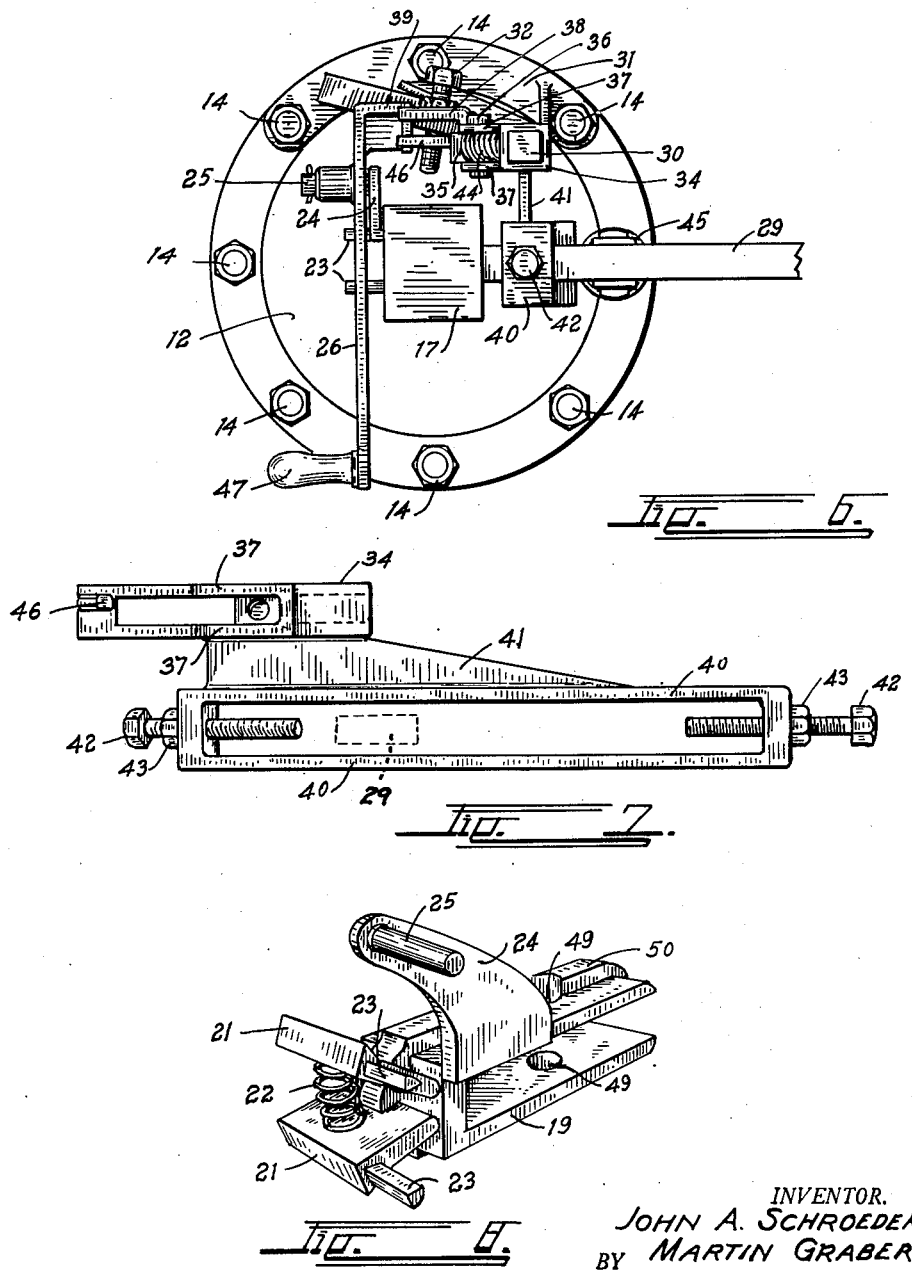

2,512,507

UNITED STATES PATENT OFFICE 2,512,507

AUTOMATIC SLACK ADJUSTER FOR AIR BRAKE PISTON TRAVEL

John A. Schroeder and Martin Graber, Denver, Colo.

Application May 17, 1948, Serial No. 27,588

4 Claims. (Cl. 188—200)

This invention relates to an automatic slack adjuster for railway air brakes. The principal object of the invention is to provide a simple, economical, durable, and highly efficient device by means of which the piston travel in the brake cylinder will be at all times automatically adjusted to accommodate lost motion in the air brake rigging, due to wear upon the brake shoes and upon the joints and bearing of the rigging.

Another object of the invention is to provide a slack adjuster which will maintain a uniform pre-set piston travel in the brake cylinder regardless of wear and which can be quickly and easily installed on present equipment without requiring any changes in the latter.

A further object is to provide manual means for releasing the adjuster, when desired for shoe replacements and repairs, and to provide an adjuster which will automatically reset itself to the proper operating position after the repairs and replacements have been made.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 1 is a side view of the improved brake slack adjuster, illustrating it applied to a conventional brake cylinder;

Fig. 2 is a plan view thereof;

Fig. 3 is a vertical section, taken on the line 3—3, Fig. 2;

Fig. 4 is a cross-section, taken on the line 4—4, Fig. 3;

Fig. 5 is a detail section view, taken on the line 5—5, Fig. 4;

Fig. 6 is an end view of the adjustor shown in Fig. 1.

Fig. 7 is a detail view of the limiting yoke 40.

Fig. 8 is a detail view of the dog carriage 19.

In the drawings, conventional parts of a railway air brake system are designated by numeral as follows: brake cylinder 10; hollow piston rod 11, cylinder head 12, piston spring at 13, cylinder head bolts 14, and brake lever 29.

The invention is applied by extending a stem 15 into the hollow piston rod 11 and securing it therein by means of a set screw 16. The stem 15 is formed integrally with a double internal ratchet bar 17 having an upper and a lower set of ratchet teeth 18. Each set is divided by means of a medial, longitudinally-extending guide groove or track 20. A dog carriage 19 is slidably mounted in the guide track 20 within the internal ratchet bar 17 so that it may move longitudinally therealong.

The dog carriage 19 carries at one extremity a pair of hinged ratchet dogs 21, which are constantly urged outwardly from each other by means of a dog spring 22.

A bracket arm 24 is formed on, and extends upwardly from the outer face of the dog carriage 19 to support an arm pivot pin 25. A releasing lever 26 is swingingly mounted on the pin 25 so as to extend downwardly across the dogs 21. The lever 26 is preferably provided with a convenient hand grip 47. Each dog is provided with a releasing lug 23 extending outwardly therefrom. The releasing lever is provided with a heart-shaped cam opening 27, through which the releasing lugs 23 project.

The shape and position of the cam opening 27 is such that, when the releasing lever 26 is swung to the left in Fig. 1, the narrower portion of the cam opening 27 will engage the releasing lugs 23 to force them toward each other against the action of the spring 22 and out of contact with both sets of ratchet teeth 18.

A wrist pin 28 extends vertically through the dog carriage 19 and projects above the top and bottom thereof into the guide tracks 20 of the double ratchet bar 17. The wrist pin 28 passes through the extremity of the brake lever 29 of the brake rigging of the car similarly to the conventional brake piston rod wrist pin. A return spring 45 extends from the brake lever 29 to any suitable fixed connection such as to the car frame or to a connection with the cylinder bolts 14 of the cylinder 10.

It can be seen from the description thus far that, if air is admitted to the cylinder 10, it will cause the piston rod 11 to force the double ratchet bar 17 outwardly. Since the dogs 21 are in engagement with the teeth 18, they will also move outwardly with the ratchet bar and carry the dog carriage 19 therewith and since the dog carriage is pinned to the brake lever 29, the brakes will be applied.

A rectangular slide bar 30 is supported above and inside of the ratchet bar 17 in a suitable bracket member 31, which is attached to the cylinder 19 by means of the cylinder head bolts 14. The slide bar 30 can be raised or lowered to bring it into perfect parallelism with the double ratchet bar 17 by means of an adjusting screw 32 which rests against the cylinder head 12 to support the weight of the slide bar 30.

The slide bar 30 is provided with ratchet teeth 33 in its outside edge. A slider 34 is slidably mounted on the slide bar 30. The slider is provided with a ratchet dog 35 mounted on a dog pin 36 extending between ears 37 formed in the side of the slider 34. The dog 35 is constantly urged into engagement with the teeth 33 by means of a spring 44.

Thus, it can be seen that, if the slider is moved to the right in Fig. 1, it cannot be returned to the left, due to the dog 35, unless the latter is released manually from the teeth 33. The manual release is provided by extending a releasing arm 38 from the dog 35 into the path of a hooked extremity 39 formed on the releasing lever 26.

An elongated limiting yoke 40 is supported from the slider 34 upon a bracket 41. The limiting yoke 40 surrounds the brake lever 29. Stop screws 42 extend into opposite ends of the limiting yoke 40 so as to be contacted by the brake lever 29 at the limits of its travel. The stop screws can be set in any desired position by means of lock nuts 43. The two stop screws 42 are pre-set to limit the maximum movement of the brake lever 29 to any desired arc.

Operation

Let us assume that air is applied to the cylinder 10. This forces the dog carriage 19 and the brake lever 29 outwardly until the brakes are fully applied. As the brake lever 29 moves outwardly, it contacts the outermost stop screw 42, causing the limiting yoke 40 to move outwardly with the brake lever 29. Since the slider 34 is integral with the yoke 40 it also moves outwardly along the slide bar 30, the dog 35 clicking over the teeth 33.

When the air is released, the return spring 45 pulls the brake lever 29 inwardly until it strikes the inner stop screw 42, at which time the brakes will be fully released and further inward movement of the brake lever will be prevented. The piston spring 13 now continues to pull the double internal ratchet bar 17 inwardly, the dogs 21 clicking over the teeth 18, until the piston rod 11 has fully completed its return stroke.

Now let us assume that the air is again admitted to the cylinder 10. It will again force the double ratchet bar 17 forwardly, and since the dogs 22 have assumed a new position on this bar, they will immediately move with it to carry the dog carriage 19 and the brake lever 29 to the fully braked position, requiring the stroke of the piston rod 11 to correspond only to the spacing between the stop screws 42.

Let us assume that the brake shoes have worn away sufficiently to allow the brake lever 29 to again contact the outermost stop screw 42. This will move the slider 34 forwardly one tooth space, where it will be held by the ratchet dog 35, and when the air is released the double ratchet bar will return to its full release position. In so doing the dogs 21 will click past one tooth 18 to again position the active arc of movement of the brake lever 29 between the stop screws 42 of the limiting yoke 40. Therefore, no attention need be given the device. It will always automatically adjust itself to fully apply and fully release the brakes within a uniform piston travel interval.

Should it be desired to renew the brake shoes or repair or replace any members of the brake rigging, the releasing lever 26 is simply pulled toward the cylinder 10. This causes the two sides of the cam opening 27 to engage the two lugs 23 to pull the two dogs 21 out of engagement with the teeth 18 so that the brake lever 29 may move toward the brake cylinder 10. This also causes the hooked extremity 39 to engage the releasing arm 38 to pull the dog 35 away from the teeth 33 so that the limiting yoke will slide toward the cylinder 10, the slider 34 traveling on the slide bar 30, so as to give the fullest possible slack to the brake rigging for repair and replacement purposes.

Normally the releasing arm 26 swings with the lugs 23 in the wide portion of the cam opening 27. When the piston rod 11 moves inward to its fully released position, however, the hook member 39 on the arm 26 will contact the return lug 46 projecting from the slider 34 to swing the lower extremity of the releasing arm 26 toward the cylinder head 12 to hold it stationary and prevent its swinging during the motion of the car.

As soon as the piston rod starts to move outwardly the lug 46 releases the arm 26 and allows it to swing to the substantially vertical position of Fig. 1, at which time a safety dog locking tongue 48 will move between the releasing lugs 23 to prevent them from becoming disengaged from the teeth 18 should the dog spring 22 become lost or broken.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. In combination with a railway brake structure including a cylinder, a piston rod projecting from the cylinder, and a brake actuating lever; a slack adjuster comprising an elongated ratchet member affixed to and extending in alignment with said piston rod, a carriage slidable along said ratchet member, a dog carried by said carriage and yieldably held in engagement with the teeth of the ratchet member whereby outward movement of the piston rod will be transmitted through the dog to said carriage, a stationary elongated ratchet member, means for fixedly securing said stationary ratchet member at one end and supporting the said ratchet member in transversely spaced relation to the first ratchet member, a slider slidable along said stationary ratchet member, a dog carried by said slider and yieldably engaging the teeth of the stationary ratchet member to prevent said slider from moving towards said cylinder, means carried by said carriage for simultaneously releasing the dogs, a yoke carried by said slider and disposed in spaced parallel relation to the two ratchet members with the lever passing through the yoke transversely thereof, means for pivoting said lever to said carriage, and adjustable abutment members carried by said yoke in position to be engaged by the lever thereby limiting tilting movement of the lever.

2. In combination with a railway brake structure including a cylinder, a piston rod projecting from an end of said cylinder, and a brake actuating lever; an elongated ratchet member extending from the outer end of the piston rod and formed with a longitudinally extending slot having teeth upon opposite walls, a carriage slidable along said ratchet member in the slot thereof, dogs pivoted to one end of said carriage and yieldably held in engagement with the teeth of said ratchet member whereby outward movement of the ratchet member with the piston rod will be transmitted through the dogs to said carriage, a stationary ratchet member mounted in upwardly spaced parallel relation to the first ratchet member, a slider slidable along the stationary ratchet member, a dog carried by said slider and yieldably held in engagement with teeth of the stationary ratchet member to normally prevent the slider from moving towards said cylinder, a yoke carried by said slider and disposed below the stationary rack member in spaced relation to both rack members and formed with a slot through which said lever passes, a pin pivoting said lever to said carriage, adjustable abutments at opposite ends of said yoke for engagement by said lever to limit tilting movement of the lever, and a member pivoted to said carriage and having portions for engaging the dogs of the carriage and the slider and moving the dogs to a releasing position when tilted out of its normal position.

3. In combination with a railway brake mechanism including a cylinder, a piston rod projecting from one end of said cylinder and urged inwardly, and a brake actuating lever; an elongated ratchet bar carried by and extending longitudinally from the outer end of said piston rod, a carriage slidable along said ratchet bar, a dog pivoted to said carriage and yieldably held in engagement with teeth of the ratchet bar and causing the carriage to travel outwardly with the piston and the ratchet bar, a stationary ratchet bar supported from said cylinder above the first ratchet bar in transverse spaced relation thereto, a slider slidable along the stationary rack bar, a dog pivoted to said slider and yieldably held in engagement with teeth of the stationary rack bar, a yoke carried by said slider in transversely spaced parallel relation to the first rack bar, said lever passing through said yoke and being pivotally connected with said carriage, the yoke serving to limit tilting movement of said lever, and an arm pivoted to said carriage and having portions engaging the dogs for moving the dogs simultaneously to a releasing position when the arm is tilted in one direction out of its normal position.

4. In combination with a railway brake structure including a cylinder, a piston rod projecting from one end of said cylinder and urged inwardly, and a brake actuating lever; a ratchet bar extending longitudinally from said piston rod and formed with a longitudinally extending slot having teeth along its upper and lower walls, a carriage slidable along said ratchet bar, dogs pivoted to one end of said carriage in transverse spaced relation to each other and yieldably held in engagement with the teeth of the ratchet bar to cause movement of the carriage with the ratchet bar when the piston rod is moved outwardly from the cylinder, lugs projecting outwardly from said dogs, a stationary ratchet bar, a bracket carried by said cylinder and supporting the stationary ratchet bar above the first ratchet bar in transversely offset relation thereto, a slider slidable along the stationary ratchet bar, a yoke mounted under said slider and extending in transversely spaced parallel relation to the first ratchet bar, said lever passing through the yoke and having one end pivoted to said carriage, a dog pivoted to said slider and yieldably held in engagement with teeth of the stationary ratchet bar, a finger projecting laterally from the last mentioned dog and overlying the first ratchet bar, and a lever arm pivoted to said carriage and formed with an opening through which the lugs of the first dogs pass and also formed with a hook at one end engaging the finger of the dog carried by said slider, walls of the opening constituting cam surfaces for moving the dogs of the carriage to a releasing position as the lever arm is tilted and its hook moves the dog of the slider to a releasing position.

JOHN A. SCHROEDER.
MARTIN GRABER.

REFERENCES CITED

The following references are of record in the file of this patent:

UNITED STATES PATENTS

| Number | Name | Date |
| --- | --- | --- |
| 515,079 | Howard | Feb. 20, 1894 |
| 636,305 | Wands | Nov. 7, 1899 |
| 996,284 | Schenck | June 27, 1911 |
| 1,107,576 | Booth | Aug. 18, 1914 |
| 1,945,692 | Johnson | Feb. 6, 1934 |